United States Patent
Sanborn et al.

(10) Patent No.: US 6,719,526 B2
(45) Date of Patent: Apr. 13, 2004

(54) METHOD FOR CATEGORIZING THE OPERATING MODE OF A GAS TURBINE

(75) Inventors: Stephen Duane Sanborn, Copake, NY (US); Douglas Ancona Catharine, Scotia, NY (US)

(73) Assignee: General Electric Company, Schenectady, NY (US)

( * ) Notice: Subject to any disclaimer, the term of this patent is extended or adjusted under 35 U.S.C. 154(b) by 28 days.

(21) Appl. No.: 10/226,215

(22) Filed: Aug. 23, 2002

(65) Prior Publication Data

US 2004/0037697 A1 Feb. 26, 2004

(51) Int. Cl.$^7$ ................................................ F01D 25/00
(52) U.S. Cl. ........................................... 415/118; 455/66
(58) Field of Search .............................. 415/1, 28, 17, 415/119, 116, 26, 13, 29, 118, 123; 416/35, 42, 170 R, 61; 455/66

(56) References Cited

U.S. PATENT DOCUMENTS 6,173,159 B1 * 1/2001 Wright et al. ................. 455/66
6,343,251 B1 * 1/2002 Herron et al. ............... 701/100
6,353,734 B1 * 3/2002 Wright et al. ................. 455/98

OTHER PUBLICATIONS

"Speedtronic™ Mark V Steam Turbine Control System", J. Kure–Jensen et al., 1996 GE Company, pp. 1–15.

"Speedtronic™ Mark IV Turbine Control system", Walter Barker et al, GE Power Systems, (10/00), pp. 1–14.

* cited by examiner

Primary Examiner—Edward K. Look
Assistant Examiner—J. M. McAleenan
(74) Attorney, Agent, or Firm—Nixon & Vanderhye, P.C.

(57) ABSTRACT

A method is disclosed for categorizing an operating mode of a gas turbine comprising: monitoring at least one operating condition of the gas turbine; using the operating condition to categorize an operating mode of the gas turbine into one of the plurality of predetermined operating modes, and assigning a value to the categorized operating mode where the value is a number that is a power of a predetermined base number.

6 Claims, 2 Drawing Sheets

METHOD FOR CATEGORIZING THE OPERATING MODE OF A GAS TURBINE

BACKGROUND OF THE INVENTION

The field of the invention is gas turbine control systems and, in particular, systems for monitoring and diagnosing gas turbine operation.

Accurately determining the operating modes of a gas turbine is useful in monitoring and diagnosing the operation of a gas turbine. Remote monitoring of gas turbines, especially industrial gas turbines, has become increasingly common. For example, technicians employed by a manufacturer of the gas turbine may remotely analyze information regarding the operation of the gas turbine at a customer site and prescribe corrective steps, such as party replacements or operation adjustments. The replacement of parts and operation adjustments may be performed by on-site operators of the gas turbine. To remotely analyze and diagnose data collected form a gas turbine, accurate information regarding the operating modes of the gas turbine is useful.

Large industrial gas turbines may transition through many operating modes from start up to shut down. In a general sense these operational modes may include Startup, Shutdown, Steady State, Thermal Instability, and Load Instability. Within each of these major modes may be one or more sub-modes of operation for the gas turbine. Associated with each of these major modes and sub-modes are operational parameters, e.g., vibration, temperatures, fuel and gas flows, heat rates and thermal efficiencies. Each of these parameters may have prescribed ranges for normal operation given a particular operating mode and sub-mode of the gas turbine. The normal ranges of these operational parameters may change from mode to mode, and sub-mode to sub-mode. An operational parameter of the gas turbine may be well within a normal range for a particular mode/sub-mode, but outside the normal ranges for some other mode/sub-mode.

In order to determine whether a particular operational parameter is within normal range it is helpful to know that particular mode/sub-mode in which the gas turbine is operating. Knowing the current operational mode/sub-mode of a gas turbine, a technician may be able to better determine whether the current values for vibration, temperatures, flow rates, heat rates, efficiencies and other conditions of the gas turbine are within normal operating ranges for those values. In addition, knowing the operational mode of a gas turbine is helpful when comparing the operation of the gas turbine to its historical operation under similar operating conditions and to other similar gas turbines.

There is a long-felt need for an algorithm for determining the operational mode and sub-modes of an industrial gas turbine. Further, there is a need for an algorithm that generates an easy to use value that designates the operational mode/sub-mode of the gas turbine.

BRIEF DESCRIPTION OF THE INVENTION

In a first embodiment the invention is a method for determining an operating mode of a gas turbine comprising: monitoring at least one operating condition of the gas turbine; using the operating condition to categorize an operating mode of the gas turbine into one of the plurality of predetermined operating modes, and assigning a value to the categorized operating mode where the value is a number that is a power of a predetermined base number.

DETAILED DESCRIPTION OF THE INVENTION

An algorithm has been developed for determining the current operating mode of a gas turbine. Accurately determining the operating mode is useful in conducting remote analyses of the gas turbine and for use in remote diagnostics of the gas turbine.

Figure 1:
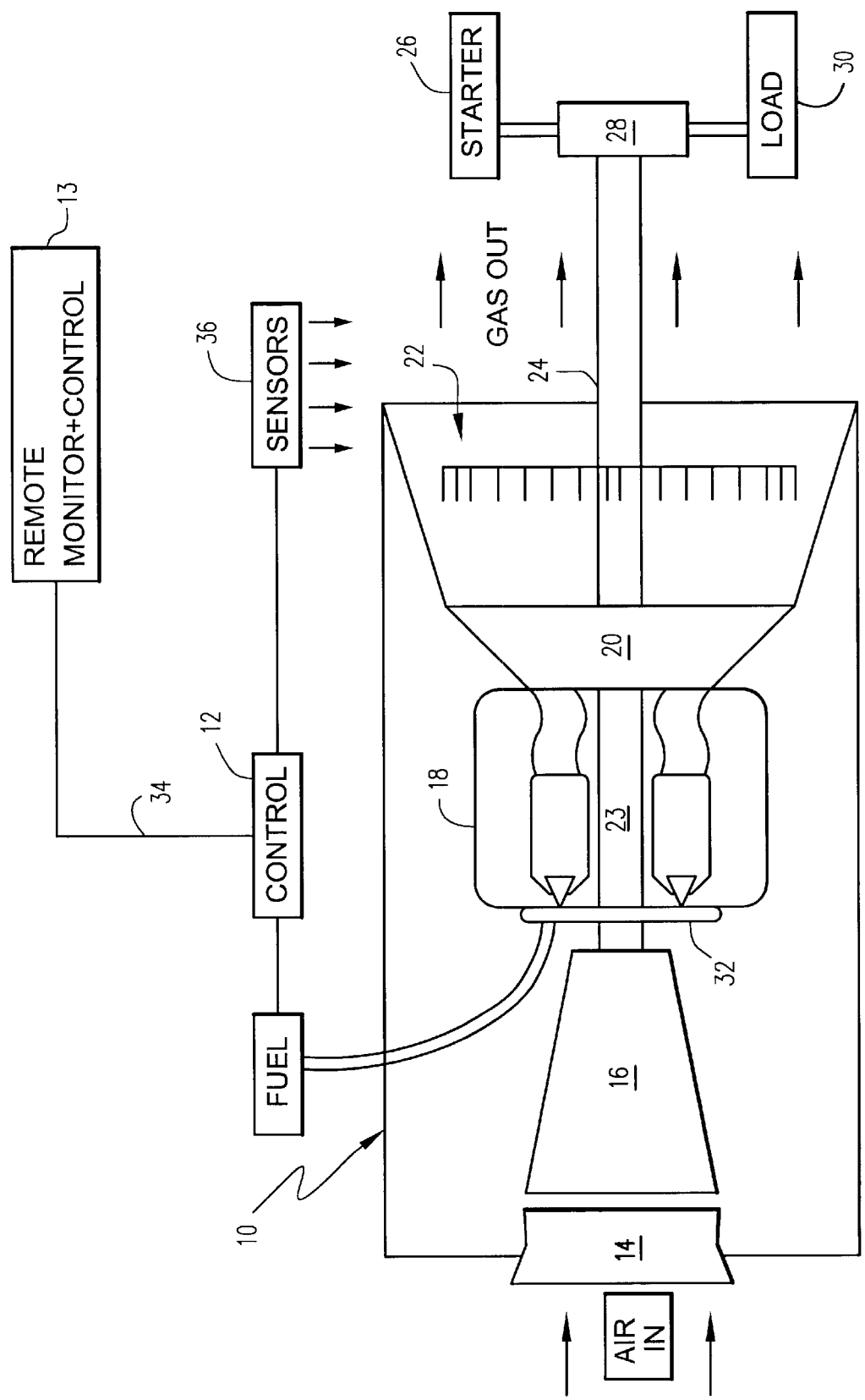
FIG. 1 is a schematic diagram of a gas turbine.

FIG. 1 is a highly-simplified schematic illustration of a gas turbine 10 and a control and monitoring system (controller) 12. A remote monitor and control system (remote controller) 13, e.g., a computer system, may also provide some control and monitoring functions for the gas turbine. The gas turbine 10 includes an inlet duct 14, a compressor 16, combustor 18, turbine 20 and exhaust duct 22. The turbine 20 drives the compressor 16 via a rotor shaft 23. The turbine also drives an output shaft 24 that may be coupled to a starter 26 via a starter transmission 28. The output shaft may also be coupled to a load 30 via the transmission.

Combustion gas, e.g., atmospheric air, is introduced into the gas turbine through the inlet duct 14. Compressed combustion gas, after flowing through the compressor 16, is combined with the fuel in the combustion system 18. The fuel and combustion gas are combined in a ratio that is known in the art and can be controlled via the controller 12. The combustion gas is provided to the combustor 18 from the compressor 16. The fuel is provided via a fuel manifold 32 and nozzles to the combustor 18. The fuel flow to the manifolds and nozzles is controlled by fuel flow controls associated with the controller 12. The combustion gas and the fuel are mixed and burned in the combustor 18 and supplied to a hot turbine 20. Hot combustion gases from the combustor 18 drives the turbine 20 which, in turn, drives the compressor via shaft 23. The turbine also drives an output shaft 24. The output shaft may be coupled to a starter 26 via a transmission 28. The transmission may also couple the drive shaft to a load 30, such as, for example, an electrical power generator. However, the present invention is not limited to the production of electrical energy and encompasses other forms of energy, such as, mechanical work and heat.

The gas turbine 10 is typically controlled via various control parameters from an automated electronic controller 12. The determination of the fuel heat content and changes in the fuel heat content can be supplied to the controller 12 to be used for control calculations or mathematical control model algorithms used to control the gas turbine system 10.

The operation of the gas turbine 10 may also be monitored and remotely controlled via a remote controller 13 that is in communication with the local gas turbine controller 12 via a wired or wireless link 32. The remote controller 13 may allow a technician to determine the operating condition of the gas turbine, without visiting the site of the gas turbine. The remote controller may be a secondary controller to the local control system 12, which provides primary control of the gas turbine and may be capable of operating independently of the remote controller 13.

The remote controller 13 should preferably be able to determine the current operating condition of the gas turbine. The current operating mode of a gas turbine is determined by monitoring many variable inputs whose values are available ether through the control system 12 or other sensors 36 on or around the turbine system 10. These variable inputs are used to determine, among other things, current input conditions, current output conditions, current rotor speed and temperature conditions. These conditions are monitored to determine current values and current trends of the gas turbine with respect to recent conditions.

Figure 2:
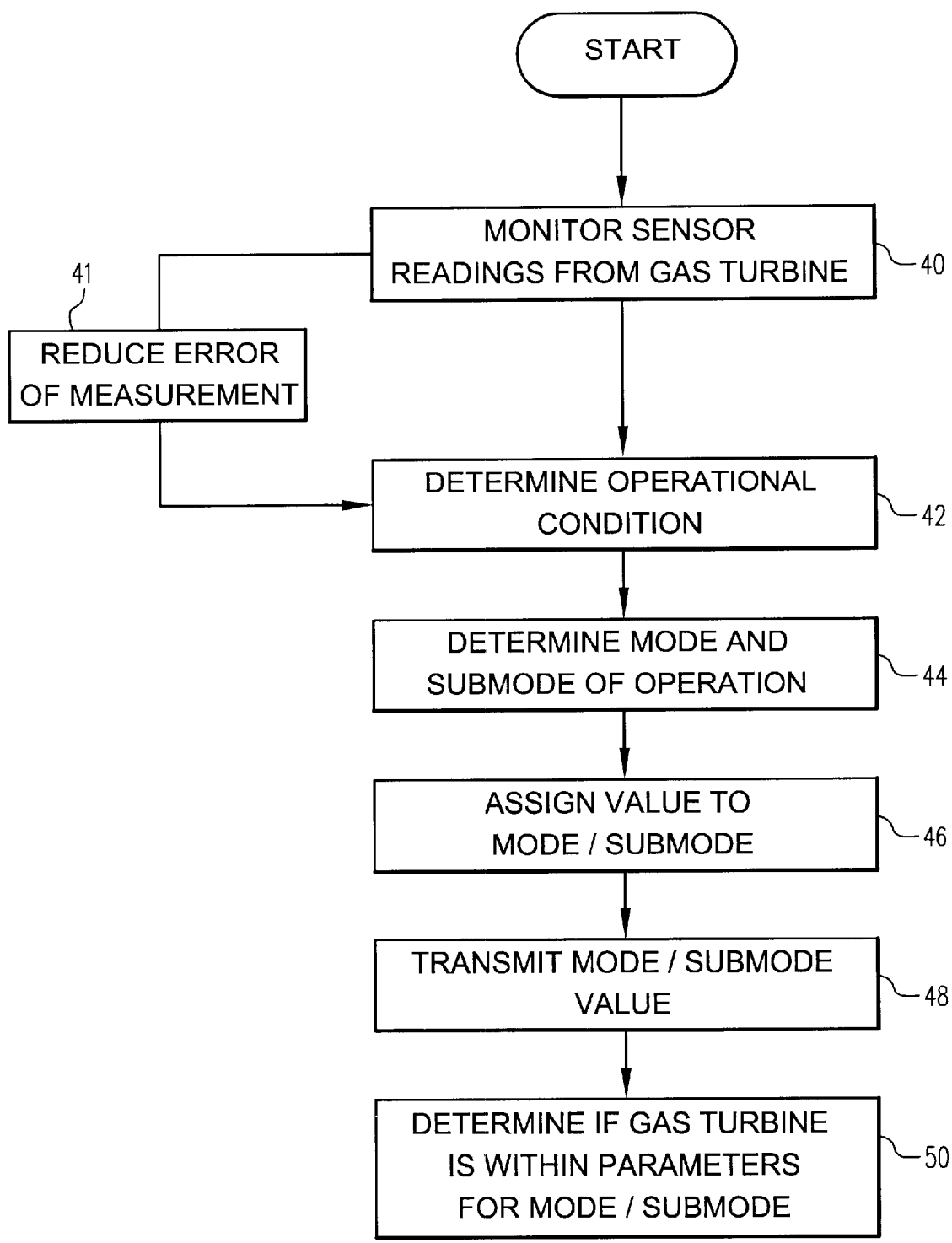
FIG. 2 is a flow chart of a method to determine the operating mode of a gas turbine.

FIG. 2 is a flow chart showing an exemplary series of steps for classifying the operational modes of a gas turbine. The operation of the gas turbine is monitored 40 by sensors 36 that collect data regarding the operation of the gas turbine 10. For example, fuel flow sensors obtain information regarding the amount and type (e.g., natural gas, fuel oil) of fuel flowing to the combustion chambers of the gas turbine, speed sensors detect the rotation speed and acceleration of the rotor, thermocouples detect various temperatures of the gas turbine, power output sensors that detect the load on the gas turbine, inlet guide vane (IGV) sensors determine the IGV angle, and pressure sensors detect various pressure levels in the gas turbine.

Using the data collected by the sensors, the controller determines 42 the operational conditions of the gas turbine. Similarly, the controller applies an algorithm to determine 44 the operating mode of the gas turbine based on the operational conditions 42. The algorithm for determining the operating mode may be a look-up table (see Table I) of various operating modes and sub-modes of a gas turbine. The look-up table and definitions of each of the modes and sub-modes stated in the look-up table may be stored in electronic memory of the controller. Using the table and definitions, the controller determines which mode and sub-mode corresponds to the current operational conditions of the gas turbine. Having determined the mode and sub-mode corresponding to the current operating condition of the gas turbine, the controller assigns 46 a value to the determined mode and sub-mode. The value may be set forth in the look-up table. The value for the mode may be transmitted 48 to a remote controller 13. At the remote controller, a determination 50 may be made as to whether the gas turbine operational parameters are within normal ranges taking into account the current operating mode and sub-mode.

The determination of the mode of operation of a gas turbine is required for many processes. The mode determination may provide, for example, information about turbine output relative to rated load of the gas turbine, temperature stability of the gas turbine, and operational stability of the gas turbine. In addition to stability determination, the range of gas turbine output relative to design or rated load may also be determined. The results of these determinations may be used to designate operational periods necessary to determine degradation or improvement of performance or health of the gas turbine unit, as well as collection of operational statistics that can be used for a variety of purposes.

The current operating mode can be represented as a single value whose value can be represented by a binary number between 0 (zero) and $2^{26}$. The modes and values currently used for operating mode are shown in Table 1:

TABLE I

| Major Mode | Sub-Mode | Binary Value |
|---|---|---|
| Unknown | Unknown | 0 |
| Startup/Shutdown | Slow Roll/cranking | 1 |
| | Accelerate Low RPM | 2 |
| | Accelerate High RPM | 4 |
| | Decelerate High RPM | 8 |
| | Decelerate Low RPM | 16 |
| Thermal Transient | Full Speed No Load | 32 |
| | Load Range 1 | 64 |
| | Load Range 2 | 128 |
| | Load Range 3 | 256 |
| | Load Range 4 | 512 |
| | Base Load | 1024 |
| | Peak Load | 2048 |
| Steady State | Full Speed No Load | 4096 |
| | Load Range 1 | 8192 |
| | Load Range 2 | 16384 |
| | Load Range 3 | 32768 |
| | Load Range 4 | 65536 |
| | Base Load | 131072 |
| | Peak Load | 262144 |
| Load Transient | Full Speed No Load | 524288 |
| | Load Range 1 | 1048576 |
| | Load Range 2 | 2097125 |
| | Load Range 3 | 4194304 |
| | Load Range 4 | 8388608 |
| | Base Load | 1677216 |
| | Peak Load | 33554432 |

The current operating mode is represented as a single value whose value can be represented by a binary number between 0 (zero) and $2^{26}$. The exemplary modes and values currently used for operating mode are shown in Table 1.

The following processes are used to classify the basic operating conditions of the gas turbine operation cycle in terms of Sub-Modes as shown in Table 1.

Slow Roll or Cranking Sub-Mode may be defined as the following gas turbine operating conditions: (i) the Control System Zero Speed Signal is equal to zero (0) and the rotational speed of the rotor 23 is sufficiently slow (the current preferred value is rotor speed less than or equal to 10% of the rated speed of the gas turbine rotor where rated speed is the normal maximum speed for which the rotor is rated by its manufacturer), or (ii) the Control System Cranking Signal is set to one, which signifies that the rotor is being turned by a starter 26 to start the gas turbine. The Control System Cranking Signal may be provided by a sensor 36 monitoring the starter drive coupling for the gas turbine, and the signal may be transmitted (via wires, wirelessly or a network, e.g., the Internet) to a remote monitoring station.

Accelerate means that the rotational speed of the rotor is accelerating such as from a Slow Roll or Cranking condition to a Full Speed condition. The Accelerate Sub-Mode may be defined as the following gas turbine operating condition: the rotor 23 rotational speed is greater than the Slow Roll or Cranking Speed (the current preferred value is greater than 10% of the gas turbine rated speed), the rotor speed is less than Full Speed (the current preferred value is less than 95% of the rated speed), and the Control System Accelerating Signal (if available) is equal to one. The Control System Accelerating Signal represents that the rotor 23 speed is accelerating at or above some predetermined threshold rate. If a Control System Accelerating Signal is not available, then the acceleration rate of the rotor may be determined by comparing a rotor 23 speed average taken over a current time period (the current preferred interval is 10 seconds) of all available rotor speed values with the rotor speed average of all available rotor speed values over a prior time interval (for example, for a 10 second period occurring 10 seconds in the past).

The Accelerate Low Sub-Mode and Accelerate High Sub-Mode may be defined over specific rotor speed regions between Slow Roll/Cranking and Full Speed. Current preferred values are between 50% and 95% of the rated rotor speed of the turbine for Accelerate High, and between 10% and 50% of the rated rotor speed for Accelerate Low.

Decelerate means that the rotational speed of the rotor is decelerating such as from a Full Speed condition to a Slow Roll or Cranking condition. The Decelerate Sub-Mode may be defined as the following gas turbine operating conditions: (i) the rotor 23 rotational speed is greater than the Slow Roll or Cranking Speed (the current preferred value is greater than 10% of the gas turbine rated speed), the rotor speed is less than Full Speed (the current preferred value is less than 95% of the rated speed), and the Control System Coast Down Signal (if available) is be equal to one. The Control System Coasting Down Signal represents that the rotor 23 speed is decelerating at or above some predetermined threshold rate. If a Control System Coasting Down Signal is not available then it may be substituted with: (i) the Control System Fired Shut Down Signal being equal to 1, or (ii) the Control System Shut Down Signal being equal to one, or (iii) a signal indicating that the rotor is decelerating. The deceleration rate of the rotor may be determined by comparing a rotor 23 speed average taken over a current time period (the current preferred interval is 10 seconds) of all available rotor speed values with the rot or speed average of all available rotor speed values over a prior time interval (for example, for a 10 second period occurring 10 seconds in the past).

The Decelerate Low Sub-Mode and Decelerate High Sub-mode may be defined over specific rotor speed regions between Slow Roll/Cranking and Full Speed. Such speed regions may be between 50% and 95% of the rated rotor speed of the turbine for Decelerate High, and between 10% and 50% of the rated rotor speed for Decelerate Low.

The Full Speed No Load (FSNL) Sub-Mode may be defined as the following gas turbine operating conditions: Rotor Speed is near Rated Speed (the current preferred value is greater than 95% of the Rated Speed) the Control System Full Speed No Load Signal is equal to one (if available), the Control System SYNC Signal (if available) is equal to one, the Generator Output is sufficiently low (the current preferred value is less than 5% of the rated load where rated load is the normal maximum energy or power output for which the gas turbine is rated by its manufacturer).

Base load means that the gas turbine is operating within the conditions defined by its design temperature curves and the inlet guide vanes to the compressor are wide open. The base load may be the design base load under current ambient and performance conditions. The Base Load Sub-Mode may be defined as the following gas turbine operating condition: The rotor speed is near rated speed (the current preferred value is greater than 95% of the rated speed), the Absolute value of the difference between the Temperature Curve Reference Temperature, the corrected Actual Median Exhaust Temperature is sufficiently small (current preferred value is less than 2° F. or 1° C.), and the Inlet Guide Vane Angle is close to the full open design value (current preferred value is within one half of a degree (0.5 deg) of angle of full design open).

Peak Load means that the gas turbine is operating above base load. The Peak Load Sub-Mode may be defined as the following gas turbine operating conditions: the rotor speed is sufficiently near rated speed (current preferred value is greater than 95% of the rated speed), the Control System PEAK signal (if available) is equal to one, and the Generator Output is sufficiently greater than the rated output load (the current preferred value is greater than 1.1% of its rated load rated load where rated load is the normal maximum energy or power output for which the gas turbine is rated by its manufacturer).

If a Control System PEAK signal is available, the Peak Load determination may be biased on the state of the PEAK signal. If the Control System PEAK signal is not available then a comparison of Generator Output to rated load can be substituted for the condition "Control System PEAK signal is equal to one" in the above definition of peak load.

Various load range sub-modes are determined so that information can be collected about the partial load operating statistics and conditions due to the operating state of a gas turbine. The overall Load Range Sub-Modes may be defined as the following gas turbine operating conditions: the rotor speed is sufficiently near rated speed (the current preferred value is greater than 95% of the rated speed), the gas turbine power output is sufficiently high (current preferred value is greater than or equal to 5% of its rated load), and the gas turbine is Not operating in Base Load or Peak Load conditions.

Upon satisfying the overall Load Range definition, the individual Load Range Sub-Modes may be defined over specific gas turbine power or energy output ranges. These values may be between 5% and 33% of rated load for Load Range 1, between 33% and 60% for Load Range 2, between 60% and 95% for Load Range 3, and greater than 95% for Load Range 4. Load Range 4 covers the condition where power or energy output is near or above rated load, but the gas turbine is not operating in the base load or peak load condition.

The following processes are used to classify the basic operating conditions of the gas turbine operation cycle in terms of Major Modes as shown in Table I.

The Startup/Shutdown Major Mode may be defined as the following gas turbine operating conditions: the gas turbine is determined to be operating in the Sub-Modes of Slow Roll/Cranking OR Accelerate Low OR Accelerate High OR Decelerate High OR Decelerate Low.

A Load Transient is designated as a major mode of the gas turbine that occurs when the power or energy output of the gas turbine is changing sufficiently to effect steady-state operation of the gas turbine. The Load Transient Major Mode may be defined as the following gas turbine operating conditions: the rate of change of gas turbine power output over time (dPower-Output/dT) is sufficiently large (current preferred value is greater than one percent of the rated load per minute), the rate of change of fuel input to the gas turbine (dFuel-Flow/dT) is sufficiently large (current preferred value is greater than 0.5% per minute), the rate of change of the inlet guide vanes (dInlet-Guide-Vane-Angle/dT) is sufficiently large (current preferred value is greater than one degree per minute), and the rate of change of the fuel pressure (dinterstage-Fuel-Pressure/dT) is sufficiently large (current preferred value is greater than 5 psi per minute).

A Thermal Transient is designated as a major mode of the gas turbine that occurs when temperature conditions within various components of the gas turbine are changing sufficiently to effect steady-state operation of the gas turbine. The Thermal Transient Major Mode may be defined as the following gas turbine operating conditions: the rate of change of any one or more of the turbine wheel space temperatures over time (dWheelspace-Temperature/dT) is sufficiently large (current preferred value is greater than 5 degrees F. per 15 minutes), less than adequate time has elapsed since the gas turbine accelerated up to a full speed, and there exists a no-load operating condition (current preferred value is less than 1.5 hours).

Often there are multiple thermocouples used to measure temperatures within a given turbine wheelspace. These thermocouples each provide an individual temperature reading of the turbine wheelspace temperature. Ideally, all thermocouples on a wheel should indicate the same temperature, but in reality there are differences among the temperature readings of a given wheelspace. To avoid falsely determining the Thermal Transient operating condition due to noisy wheelspace thermocouples the standard deviation of the temperature measurements is used to qualify the temperature measurements. Those thermocouples (current preferred value is the two thermocouples) with the highest standard deviation over the recent past (current preferred values is over the last 60 seconds) are excluded from consideration in determining the Thermal Transient operating condition on gas turbine units where a sufficiency of wheelspace thermocouples are available (current preferred value is greater then four wheel space thermocouples).

Statistical characteristics of multiple independent measurements of a given operating condition are determined, such as for the thermocouple measurements. The standard deviation calculated over time for each independent measurement, may be used to reduce error in using the operating condition to categorize an operating mode of the gas turbine into one of the plurality of predetermined operating modes.

Steady State is designated as a major mode of the gas turbine that occurs when the gas turbine is determined to be operating in a steady state condition.

By representing the operating condition Major-Mode and Sub-Mode values as number equal powers of 2 (two), then any single number, between 0 and 67108863 can be used to represent any number of operating condition values. For example, the number 520192 would represent in a single number all of the steady-state conditions shown in Table II:

TABLE II

| | |
|---|---|
| Steady-state Full Speed No Load | 4096 |
| Steady-state Load Range 1 | 8192 |
| Steady-state Load Range 1 | 16384 |
| Steady-state Load Range 1 | 32768 |
| Steady-state Load Range 1 | 65536 |
| Steady-state Base Load | 131072 |
| Steady-state Peak Load | 262144 |
| Total | 520192 |

The ability to represent several different operating conditions with a single variable as shown in Table II is useful when evaluating operational parameters with regard to normal ranges or expected behavior. For example, gas turbine thermal performance operational parameters are well understood under steady-state operating conditions but are generally difficult to evaluate in other than steady-state conditions. By using the operating condition Major-Mode and Sub-Mode representation shown in Table II it is possible to describe a single algorithm that can evaluate thermal performance across all Load Ranges including Base Load and Peak Load but only under steady-state conditions. Similarly it is possible to describe a single algorithm that can evaluate thermal performance operational parameters under the base load operating condition that encompasses all Major-Modes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for tracking an operating mode of a gas turbine comprising:

a. monitoring at least one operating condition of the gas turbine;

b. using the operating condition to categorize an operating mode of the gas turbine into one of the plurality of predetermined operating modes;

c. assigning a value to the categorized operating mode where the value is a number that is a power of a predetermined base number;

d. using the assigned value to select a normal range for an operational parameter for the gas turbine, and e. determining whether an actual operational parameter for the gas turbine is within said normal range.

2. A method as in claim 1 wherein the base number is two.

3. A method as in claim 1 wherein the predetermined operating modes include a plurality of major modes and a plurality of sub-modes, wherein each of said sub-modes is associated with one of said plurality of major modes.

4. A method as in claim 3 wherein the plurality of major modes include an unknown mode, a startup or shutdown mode, a thermal transient mode, a steady-state mode, and a load transient mode.

5. A method as in claim 4 wherein said plurality of sub-modes includes: a slow roll or cranking sub-mode, an accelerate high sub-mode, an accelerate low sub-mode, a decelerate high bus-mode, and a decelerate low sub-mode which are associated with the startup or shutdown mode.

6. A method as in claim 1 wherein statistical characteristics of multiple independent measurements of a given operating condition, such as the standard deviation calculated over time for each independent measurement, are used to reduce error in using the operating condition to categorize an operating mode of the gas turbine into one of the plurality of predetermined operating modes.

* * * * *